UNITED STATES PATENT OFFICE.

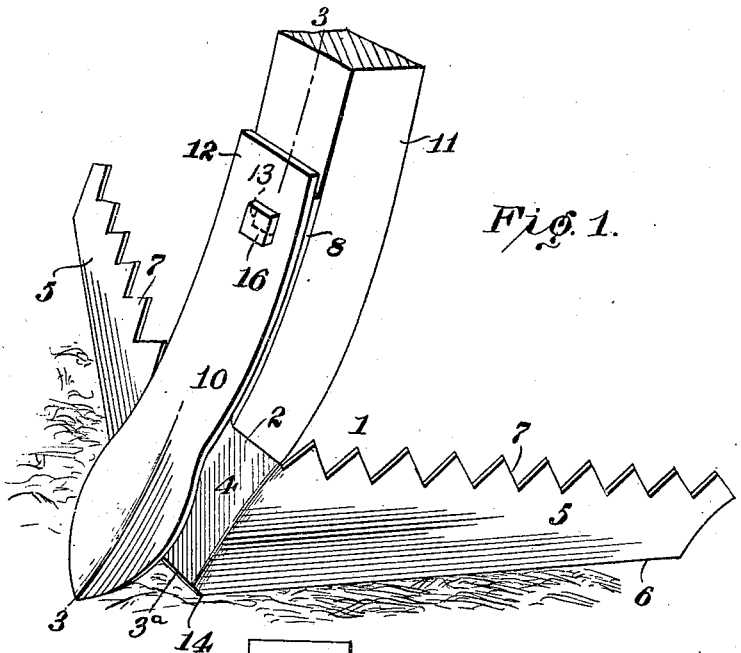

RANDALL C. BRYAN, OF MORTIMER, ALABAMA.

PLOW.

No. 904,403.    Specification of Letters Patent.    Patented Nov. 17, 1908.

Application filed August 18, 1908. Serial No. 449,150.

*To all whom it may concern:*

Be it known that I, RANDALL C. BRYAN, a citizen of the United States, residing at Mortimer, in the county of Escambia and State of Alabama, have invented certain new and useful Improvements in Plows, of which the following is a specification.

This invention relates to improvements in scraper plows.

The prime object of the invention is to provide two side wings and a head in a single piece, the head having a slotted extension by which a shovel or point may be adjustably connected thereto.

Considerable difficulty has been experienced with scraper plows now in use due to the fact that in many cases, the head forming the standard pocket at the juncture of the two wings has not been properly placed to allow the edges of the wings to cut into the soil along the edges of the furrow formed by the point of the plow or shovel. In other cases, the shank adjacent the head has been so short as to preclude the use of a shovel of sufficient length to permit of adjustment, to compensate for wear after the plow has been used for a limited time.

It is therefore one of the objects of my invention to arrange the parts to avoid these impracticable conditions as will be hereinafter described.

A further object of the invention is to provide a plurality of pointed projections on the upper edges of the wings to break the soil as it falls from said wings.

Other objects and advantages will be hereinafter set forth, and particularly emphasized in the claims.

In the drawings:—Figure 1, is a perspective view of my invention. Fig. 2, is a front view of the scraper. Fig. 3 is a vertical section on line 3—3 Fig. 1.

Numeral 1, indicates the scraper as a whole, which comprises a head or pocket 2, having an inclined front face 3, and two angularly disposed side walls 4. Extending outwardly and rearwardly from the side walls 4, are wings 5, provided at their bottoms with cutting edges 6, and on their upper edges having a series of teeth or serrations 7. The face 3, extends upwardly beyond the head or pocket 2, to form a tang 8, slotted at 9, to provide means for attaching a shovel 10, to a plow standard 11.

The plow point or shovel 10, is elongated to form a stem 12, having a square opening 13, while the lower portion is approximately the width of or slightly wider than the head or face 3, to form a coöperative relationship between said point, and the edges or points 14 of the wings 6. In this connection it will be noticed that the lower edges of the side faces 4 of the head incline downwardly to the points 14, to cause a slight elevation of the lower edge 3$^a$, of the face 3, so as to permit the edges 14 of said wings to effectually cut into the earth as the implement is drawn over the ground.

In operation, the head or pocket is placed over the end of the plow standard to form a snug fit, the side walls 4, preventing lateral sagging of the scraper, then the shovel is attached to the tang 8, by a bolt 16, passing through the opening 13, slot 9, and the standard 11. The opening 13, being square, corresponds, with the square portions of the bolt, which prevents the shovel from sagging, sidewise, so that when the nut of the bolt is tightened, the scraper and shovel are rigidly connected to the standard, and the strain is so equalized as will prevent under wearing of the parts.

By having an extended tang, as shown in the drawing, and providing the shovel point with an extension, said shovel can be used over again when the point becomes worn. Obviously after the point is worn it can be detached and sharpened, and by reason of the slot in the tang it can be properly positioned again on the scraper, thereby effecting a great saving of expense.

The shovel point can be adjusted to make its cutting edge as deep as desirable, as may be found most convenient for varying conditions of the soil. The point of the shovel forms a furrow, and the edges or points 14, of the scrapers are so situated, as to cut into the soil at the edge of the furrow to gradually make the cut as the implement is forced over the ground. By the position of the parts, the edges of the wings have a shearing action, and the soil is of course forced over the face of said wings and falls over the top thereof. When the soil reaches the teeth or serrations it causes a breaking action, and pulverizes the earth. As is well known the soil is turned up over the wing in the form of folds, and it is the office of the teeth to cut or break up the folds as it drops to the rear of the wings, as will appear obvious from the drawings.

What I claim is:—

1. As an improved article of manufacture a scraper formed of a single piece of metal, and comprising a head having a flat front face which is extended beyond the scraper to form a tang which is slotted, and two right angularly disposed depending side walls, the latter being of less width at the bottom than at the top, the flat face and the side walls forming a standard receiving pocket, and wings extending from said walls, said wings being rearwardly and outwardly inclined.

2. As an improved article of manufacture a scraper formed of a single piece of metal, and comprising a head having a flat front face with an extended slotted tang and two depending side walls, the latter being of less width at the bottom than at the top, the flat face and the side walls forming a pocket, and wings extending from said walls, said wings being rearwardly and outwardly inclined, and provided on their upper edges with a series of teeth.

3. In a scraper the combination of a standard, a head and two wings formed from one piece of metal, the front face of the head being spaced from the front edges of the wings by walls, the latter with the front face forming a standard receiving pocket, a tang extending from the front face, said tang having a slot above the top plane of the wings, a shovel resting on the flat face and tang, said shovel having an elongated stem, a portion of the shovel being substantially the same width as the distance between the lower edges of the wings, and a bolt adjustably connecting the shovel to the tang and standard.

In testimony whereof I affix my signature in presence of two witnesses.

RANDALL C. BRYAN.

Witnesses:
 W. N. WOODSON,
 JNO. IMIRIE.